United States Patent
Krastev et al.

(10) Patent No.: US 6,647,193 B2
(45) Date of Patent: Nov. 11, 2003

(54) WAVEGUIDE OPTICAL FIBER FOR PARAMETRIC AMPLIFICATION WITHIN S-BAND OPTICAL RANGE

(75) Inventors: Krassimir Krastev, Paris (FR); Dominique Labilloy, Paris (FR)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/005,134

(22) Filed: Nov. 26, 2001

(65) Prior Publication Data

US 2003/0099449 A1 May 29, 2003

(51) Int. Cl.$^7$ .................................. G02B 6/22
(52) U.S. Cl. .................. 385/127; 385/123; 385/124; 385/126; 359/161; 359/173; 372/50
(58) Field of Search .................... 385/123, 124, 385/125, 126, 127, 128, 129; 359/161, 173; 372/45, 46, 50

(56) References Cited

U.S. PATENT DOCUMENTS

| | | | |
|---|---|---|---|
| 5,274,495 A | 12/1993 | Shirasaki | 359/330 |
| 5,483,612 A * | 1/1996 | Gallagher et al. | 385/127 |
| 5,604,618 A | 2/1997 | Mori et al. | 359/127 |
| 6,134,367 A | 10/2000 | Jones et al. | 385/124 |
| 6,266,467 B1 | 7/2001 | Kato et al. | 385/123 |
| 6,490,396 B1 * | 12/2002 | Smith | 385/123 |

FOREIGN PATENT DOCUMENTS

| EP | 0 708 357 A2 | 11/1995 |
|---|---|---|
| EP | 0 767 395 A2 | 2/1996 |

OTHER PUBLICATIONS

"Nonlinear Fiber Optics" Govind P Agrawal, Academic Press, p. 404, 1995.

"Demonstration of two–pump fibre optical parametric amplification", Yang et al., Electronics Letters, 9$^{th}$ Oct. 1997, vol. 33, No. 21, p. 1812–1813.

"Highly Nonlinear Dispersion–Shifted Fibers and Their Application to Broadband Wavelength Converter", Onishi et al., Optical Fiber Technology 4, 204–214 (1998), Article No. OF980248.

"Simultaneous Wavelength Conversion and Optical Phase Conjugation of 200 Gb/s (5×40 Gb/s) WDM Signal Using a Highly Nonlinear Fiber Four–wave Mixer", Watanabe et al., ECOC 97, Sep. 22–25, 1997, Conference Publication No. 448.

"Parametric Amplification and Frequency Conversion in Optical Fibers", Stolen et al, IEEE Journal of Quantum Electronics, vol. Q–E 18, No. 7, Jul. 1982, p. 1062–1072.

(List continued on next page.)

Primary Examiner—Phan T. H. Palmer
(74) Attorney, Agent, or Firm—Svetlana Z. Short

(57) ABSTRACT

An optical waveguide fiber including a core region, an inner clad layer surrounding and in contact with the core region and an outer clad layer surrounding and in contact with the inner clad layer. The refractive index percent of the radii of the core region, the inner clad layer and the outer clad layer are chosen from the following ranges: the index of the core region within the range of from about 1.332 to about 1.628; the index of the inner clad layer within the range of about 1.30 to about 1.591; the index of the outer clad layer within the range of from about 1.305 to about 1.595; the outer radius of the core region within the range of from about 1.71 $\mu$m to about 2.09 $\mu$m; and, the outer radius of the inner clad layer within the range of from about 4.41 $\mu$m to about 5.39 $\mu$m.

48 Claims, 2 Drawing Sheets

OTHER PUBLICATIONS

"Four–Wave Mixing in an Optical Fiber in the Zero–Dispersion Wavelength Region", Kyo Inoue, Journal of Lightwave Technology, vol. 10, No. 11, Nov. 1992, p. 1553–1561.

"Low–power, high–efficiency wavelength conversion based on modulation instability in high nonlinearity optical fiber", Nowak et al., OFC '98 Technical Digest, Friday Morning, p. 373–374.

"Active Optical Pulse Compression with a Gain of 29.0 dB by Using Four–Wave Mixing in an Optical Fiber", Yamamoto et al., IEEE Photonics Technology Letters, vol. 9, No. 12, Dec. 1997, 1595–1597.

"Fibre optical parametric amplifier operating near zero–dispersion wavelength", Kagi et al., Electronics Letters, Oct. $26^{th}$, 1995, vol. 31, No. 22, p. 1935–1937.

"Highly efficient conversion and parametric gain of nondegenerate forward four–wave mixing in a singlemode fibre" Watanabe et al., Electronics Letters Jan. $20^{th}$, 1994, vol. 30, No. 2, pg. 163–164.

"Highly Efficient Four–Wave Mixing in an Optical Fibre with Intensity Dependent Phase Matching", Yamamoto et al., IEEE Photonics Technology Letters, vol. 9, No. 3, Mar. 1997, p. 327–329.

"Broadband fiber optical parametric amplifiers" Marhic et al., Optics Letters, Apr. 15, 1996, vol. 21, No. 8, p. 573–575.

* cited by examiner

WAVEGUIDE OPTICAL FIBER FOR PARAMETRIC AMPLIFICATION WITHIN S-BAND OPTICAL RANGE

BACKGROUND OF THE INVENTION

1. Field of the Invention

The invention is directed to a single mode optical waveguide fiber for use in telecommunication systems and more particularly, a waveguide optical fiber allowing parametric amplification within the S-band optical range.

2. Technical Background

The continuous growth of bandwidth requirements in optical based communication systems has resulted in a large demand for systems able to operate within several optical wavelength ranges including the S-band optical range, the C-band optical range and the L-band optical range. The S-band is defined as the wavelengths between 1465 nm and 1525 nm, which lies below the C-band wavelength range which extends between 1525 nm and 1560 nm, which in turn lies just below the L-band wavelength range which extends between 1560 nm and 1600 nm. In order to create a viable operating bandwidth, a large bandwidth must be obtained within each of the operating wavelength ranges. Currently, most telecommunications systems utilize the C-band and L-band signal ranges. Pumping within the S-band optical frequency range has also been utilized to pump Raman amplifiers operating in the C-band range. However, the use of distributed Raman amplification for amplification within the C-band creates a "dead" band between 1491 nm and 1497 nm for the Raman pump.

Parametric amplification is a method previously utilized within the C-band wavelength range to amplify a large bandwidth. Parametric amplification is a non-linear process based on four-wave mixing in high non-linearity dispersion shifted fibers. In short, parametric amplification is a means of amplifying optical waves whereby an intense coherent pump wave is made to interact with a signal wave co-propogating in the nonlinear medium. Four-wave-mixing based parametric amplification is efficient when phase-matching between the pump signal and the amplified signals is approached. One of the ways to Phase-match the pump and the signals in single mode fibers is to work around the zero point of dispersion in a dispersion shifted fiber.

SUMMARY OF THE INVENTION

This invention meets the need for a single mode optical waveguide fiber that allows amplification of an optical signal in the S-band optical range. More specifically, the invention meets the need for a single mode optical waveguide fiber that provides a zero dispersion operating wavelength within the range of between about 1491 nm and about 1497 nm.

In a first embodiment, an optical waveguide fiber, includes a core region having a relative refractive index percent and an inner and an outer radius, and an inner clad layer surrounding and in contact with the core region, the inner clad layer having a refractive index percent and an outer radius. The optical waveguide fiber also includes an outer clad layer surrounding and in contact with the inner clad layer, the outer clad layer having a refractive index. The refractive index and the radii of the core region, the inner clad layer and the outer clad layer are chosen from the following ranges: the index of the core region within the range of from about 1.332 to about 1.628; the index of the inner clad layer within the range of from about 1.301 to about 1.591; the index of the outer clad layer within the range of from about 1.305 to about 1.595; the outer radius of the core region within the range of from about 1.71 μm to about 2.09 μm; and, the outer radius of the inner clad layer within the range of from about 4.41 μm to about 5.39 μm.

In a second embodiment, an optical waveguide fiber includes a core region having a relative refractive index percent and an outer radius, and an inner clad layer surrounding and in contact with the core region, the inner clad layer having a relative refractive index percent and an outer radius. The optical waveguide fiber also includes an outer clad layer surrounding and in contact with the inner clad layer, the outer clad layer having a relative refractive index percent. The refractive index and the radii of the core region, the inner clad layer and the outer clad layer are chosen from the following ranges: the index of the core region within the range of from about 1.338 to about 1.636; the index of the inner clad layer within the range of from about 1.307 to about 1.597; the index of the outer clad layer within the range of from about 1.311 to about 1.603; the outer radius of the core region within the range of from about 2.61 μm to about 3.19 μm; and, the outer radius of the inner clad layer within the range of from about 5.31 μm to about 6.49 μm.

The present invention also includes methods for constructing optical waveguide fibers and an optical communication system employing the fibers in accordance with the embodiments described above.

Reference will now be made in detail to the present preferred embodiments of the invention, examples of which are illustrated in the accompanying drawings. Exemplary embodiments of the segmented core refractive index profile of the present invention is shown in each of the figures.

DETAILED DESCRIPTION OF THE PREFERRED EMBODIMENTS

Figure 1:
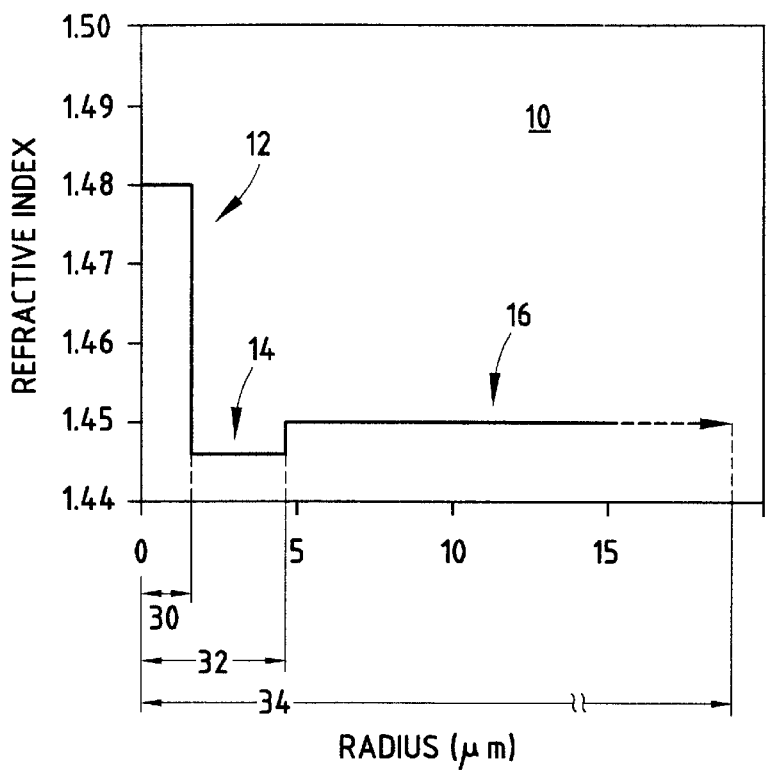
FIG. 1 is a diagram of a waveguide fiber refractive step index profile of an optical waveguide having three segments.

Additional features and advantages of the invention will be set forth in the detailed description which follows and will be apparent to those skilled in the art from the description or recognized by practicing the invention as described in the description which follows together with the claims and appended drawings.

It is to be understood that the foregoing description is exemplary of the invention only and is intended to provide an overview of the understanding of the nature and character of the invention as it is defined by the claims. The accompanying drawings are included to provide a further understanding of the invention and are incorporated and constitute part of the specification. The drawings illustrate further features and embodiments of the invention which, together with their description, serve to explain the principles and operation of the invention.

Definitions

The following terminology and definitions are commonly used in the art.

The radii of the segments of the core are defined in terms of the index of refraction, or the material of which the segment is made. A particular segment has a first and a last refractive index point. A central segment has an inner radius of zero because the first point of the segment is on the center line. The outer radius of the central segment is the radius drawn from the waveguide center line to the last point of the refractive index of the central segment. For a segment: having a first point away from the center line, the radius of the waveguide center line to the location of its first refractive index point is the inner radius of that segment. Likewise, the radius from the waveguide center line to the location of the last refractive index point of the segment is the outer radius of that segment.

The segmented radii maybe conveniently defined in a number of ways. In this application, radii are defined in accordance with the figures, described in detail below. The definitions of segment radius and refractive index, used to describe refractive index profile, in no way limit the invention. Definitions are given herein because in carrying out model calculations, the definitions must be used consistently. The model calculations set forth in the tables below are made using the geometrical definitions labeled in the figures and described in the detailed description.

The delta percent of a segment, Δ%, as used herein, is defined by the equation, $$\Delta\% = 100 \times (n_i^2 - n_c^2)/2n_c^2,$$

wherein $n_i$ is the maximum refractive index of the index profile segment denoted as i, and $n_c$, the referenced refractive index, is taken to be the minimum index of the clad layer (which is usually silica oxide). Every point in the segment has an associated relative index. The maximum relative index is used to conveniently characterize a segment whose general shape is known.

The term relative refractive index profile or index profile is the relation between Δ% or refractive index and radius for a selected segment of the core. The term α profile, a/k/a graded index profile, refers to refractive index profile that may be expressed by the equation, $$n^2(r) = n_o^2(1 - \Delta\%)(r/a)^\alpha,$$

where n(r) is the refractive index (index), r is core radius, Δ% is defined above, a is the last point in the profile segment, the value of r at the first point of the α-profile is chosen to accord with the location of the first point of the profile segment, and α is an exponent which defines the profile shape. Other index profiles include a step index, a trapezoidal index and a rounded step index, in which the rounding is usually due to dopant diffusion in regions of rapid refractive index change.

Total dispersion is defines as the algebraic sum of waveguide dispersion and material dispersion. Total dispersion is also referred to as chromatic dispersion in the art. The units of total dispersion are ps/nm–km.

A refractive index profile in general has an associated effective refractive index profile that is different in shape. An effective refractive index profile may be substituted, for its associated refractive index profile without altering the waveguide performance.

The propagation equations for the injected optical signal and the pump signal, as well as the idler wave created in the four-wave-mixing process, are defined by the equations:

$$-i\frac{dE_p}{dz} = \gamma(|E_p|^2 + 2(|E_s|^2 + |E_c|^2))E_p + 2\gamma E_s E_c E_p^* e^{i\Delta kz} + \frac{\alpha_p}{2}E_p$$

$$-i\frac{dE_s}{dz} = \gamma(|E_s|^2 + 2(|E_c|^2 + |E_p|^2))E_s + \gamma E_c^* E_p^2 e^{i\Delta kz} + \frac{\alpha_s}{2}E_s$$

$$-i\frac{dE_c}{dz} = \gamma(|E_c|^2 + 2(|E_s|^2 + |E_p|^2))E_c + \gamma E_s^* E_p^2 e^{i\Delta kz} + \frac{\alpha_c}{2}E_c,$$

where $E_p$, $E_s$, and $E_c$ are the signal and idler fields, and $\alpha_p$, $\alpha_s$, and $\alpha_c$ are the passive losses for the three fields. It is assumed that the passive losses are the same for the pump, signal and idler waves, thereby resulting in $\Delta_p = \alpha_s = \alpha_c = \alpha$.

The phase mismatch, $\Delta_k$, between the pump, signal and idler waves is defined as, $$\Delta k = -\frac{2c\lambda_0^3 \pi}{\lambda_p^3 \lambda_s^2} \frac{dD}{d\lambda}\bigg|_{\lambda=\lambda_0}(\lambda_p - \lambda_s)^2(\lambda_p - \lambda_0),$$

where $\lambda_0$ is the zero-point of dispersion, dD/dλ is the slope of the dispersion at the wavelength of the zero-point of dispersion and $\lambda_p$ and $\lambda_s$ are the wavelengths of the pump and the signal, respectively.

The non-linear coefficient of the fiber gamma is defined by the equation:

$$\gamma = 2\pi n_{NL}/(\lambda A_{eff}),$$

where $n_{NL}$ is the non-linear refractive index of the core, λ is the wavelength used, and $A_{eff}$ is the mode field effective area.

The segmented core optical waveguide described and disclosed herein has a generally segmented core. Each of the segments is described by a refractive index profile, delta percent, Δ%, and an outside radius, $r_i$. The i and r on Δ refers to a particular segment. The segments, are numbered 1 through n beginning with the inner most segment which includes the waveguide long axis center line. A clad layer having a refractive index of $n_c$ surrounds the core.

The radius, relative refractive index, and refractive index profile of each segment of the core are selected to provide a zero dispersion wavelength within the range 1491 nm to 1497 nm.

A general representation of the core refractive index profile is illustrated in FIG. 1, which shows relative refractive index percent charted versus waveguide radius. Although FIG. 1 shows only 3 discreet segments, it is understood that the functional requirements may be met by forming an optical fiber having more than 3 segments. However, embodiments having fewer segments are usually easier to manufacture and are therefore preferred.

The step index profile structure characteristic of the novel waveguide fiber 10 is shown by a core segment 12, a depressed cladding 14, and an outer cladding 16. The refractive index of the core, depressed cladding and cladding are each positive. The refractive index profile associated with each segment may be adjusted to reach a fiber design which provides the required waveguide fiber properties.

Figure 2:
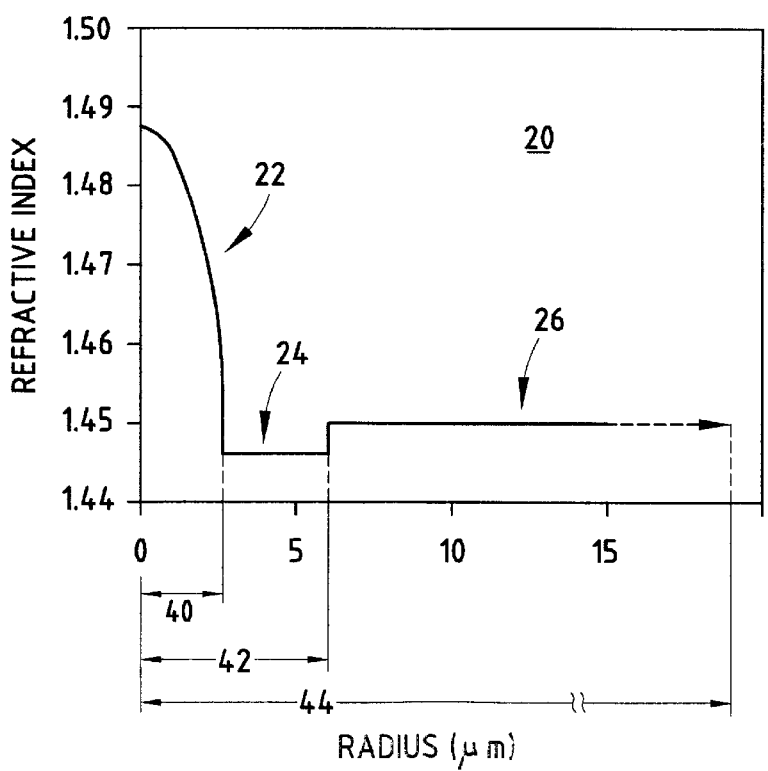
FIG. 2 is a diagram of a waveguide fiber refractive graded index profile of an optical waveguide having three segments.

FIG. 2 illustrates a variation of the novel waveguide fiber design. In this design, the index profile structure has a graded index and includes a core segment 22, a depressed cladding 24, and an outer cladding 26. Again, properties associated with the fiber segments can be altered as described below.

EXAMPLE 1

The diagram of FIG. 1 is an embodiment of the novel waveguide fiber which provides a zero-dispersion wavelength of between 1491 nm and 1497 nm and which has three segments 12, 14 and 16. The central core or first segment 12 has a refractive index, of within the range of from about 1.332 to about 1.628, and an outer radius 30, $r_1$, of within the range of from about 1.71 μm to about 2.09 μm. The central core 12 has a preferred refractive index, of about 1.48 and a preferred outer radius of about 1.9 μm. The first surrounding annual segment or second segment 14 has a refractive index, of within the range of from about 1.301 to about 1.591, and a preferred refractive index of about 1.446. The outer radius 30, $r_1$, of the central segment 12 is also the inner radius of the first annular segment 14. The radius 30, $r_1$, therefore, is the intersection of the central segment 12 and the first annular segment 14. This convention will be used consistently in all the examples and corresponding figures.

The outer radius 32, $r_2$, of the first annular segment 14, is within the range of from about 4.41 μm to about 5.39 μm, and is preferably of from about 4.9 μm. The second surrounding annular segment 16 has a refractive index of within the range of from about 1.305 to about 1.595, and is preferably about 1.450. The outer radius 32 $r_2$, of the first annular segment 14 is also the inner radius of the second annular segment 16. The radius 32 $r_2$, therefore, is the intersection of the first surrounding annular segment 14 and the second surrounding annular segment 16. The outer radius 34 of the second annular segment 16 is approximately 125 μm, however, this radius can vary greatly.

EXAMPLE 2

Another embodiment of a waveguide fiber providing a zero dispersion wavelength of between 1491 nm and 1497 nm has three wavelengths, including a central segment 22, a second segment or first annular segment 24, and a third segment or second annular segment 26, and is shown in FIG. 2.

The central segment 22 has a refractive index of within the range of from about 1.338 to about 1.636, and is preferably about 1.487. The first annular segment 24 has a refractive index of within the range of from about 1.307 to about 1.597, and is preferably about 1.452. The second annular segment 26 has a refractive index of within the range of from about 1.311 to about 1.603, and is preferably about 1.457.

The radii for the second embodiment are calculated using the conventions set forth in FIG. 1. The radius 40, $r_1$, of the central segment 22, is within the range of from about 2.61 μm to about 3.19 μm, and is preferably about 2.9 μm. The outer radius 42 $r_2$, of the first annular segment 24 is within the range of from about 5.31 μm to about 6.49 μm, and is preferably about 5.9 μm. The outer radius 44 of the second annular segment or outer cladding is approximately 125 μm, however, this radius can vary greatly.

Figure 3:
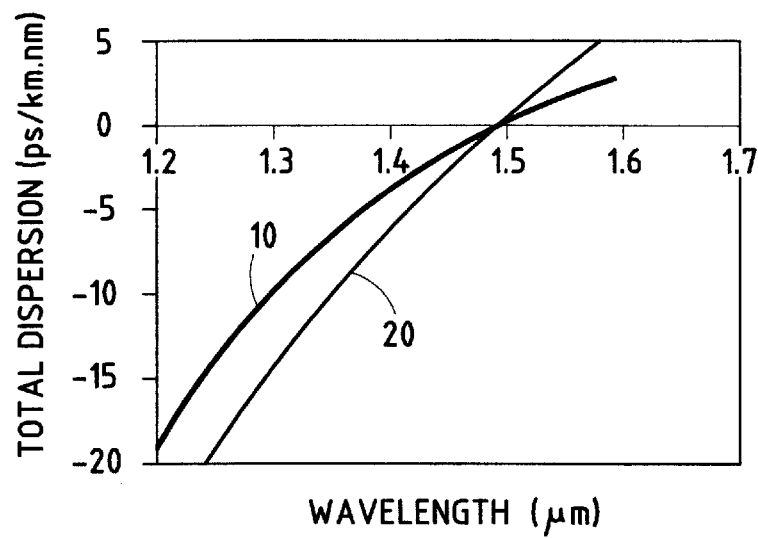
FIG. 3 is a graph of total dispersion versus wavelength of the optical waveguides of FIG. 1 and FIG. 2.

FIG. 3 graphs total dispersion versus wavelength for the fibers of examples 1 and 2 above and shows the dispersion slope of each fiber. It should be noted that the step index fiber 10 has a lower dispersion slope value within the 1491 nm to 1497 nm wavelength range as compared to the graded index fiber 20. The lower dispersion slope value provides a more efficient amplification of the associated source signal by reducing the gain ripple effect.

Figure 4:
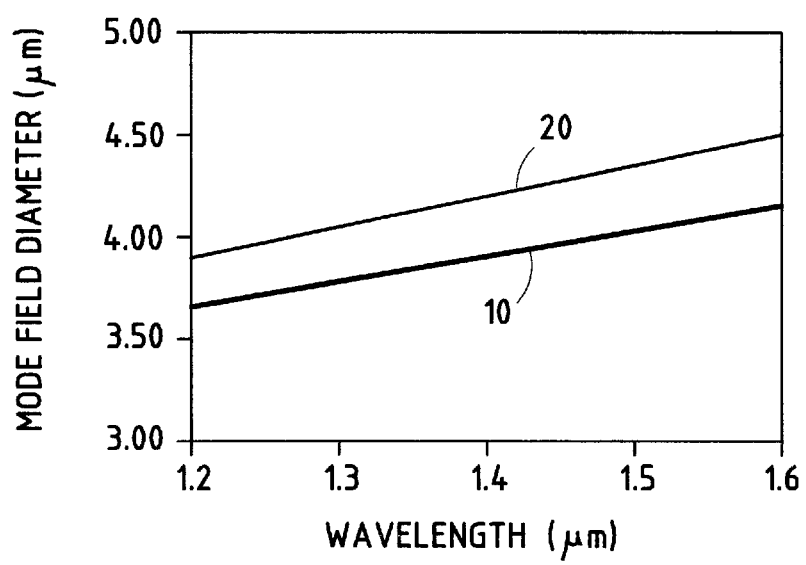
FIG. 4 is a graph of mode field diameter versus wavelength for the optical waveguides of FIG. 1 and FIG. 2; and, FIG. 5 is a schematic view of a fiber optic communication system employing an optical fiber of the present invention.

FIG. 4 graphs mode field diameter versus wavelength for the fibers of examples 1 and 2 above. FIG. 4 shows that the mode field diameter for the graded index fiber 20 is greater than that for the step index fiber 10 at a given wavelength. The advantage of the increase mode field diameter of the graded index fiber 20 is a smaller internal stress region between the core and the cladding as compared to the step index fiber 10.

The refractive indices and the cross-sectional profile of the fibers made according to the present invention can be accomplished using manufacturing techniques known to those skilled in the art.

Figure 5:
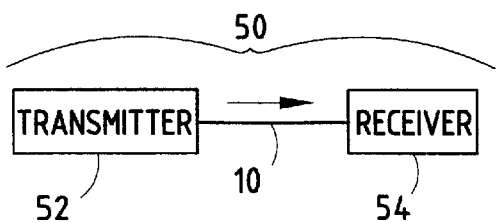

As shown in FIG. 5, and in accordance with the present invention, the optical waveguide fiber 10 (or 20) is constructed and configured in accordance with the present invention and used in an optical communication system 50. System 50 includes a transmitter 52 and a receiver 54, wherein transmitter 52 transmits an optical signal via optical fiber 10 (or 20), which in turn is received by 54 after being amplified within optical fiber 10 (or 20).

It will become apparent to those skilled in the art that various modifications to the preferred embodiment of the invention as described herein can be made without departing from the spirit or scope of the invention as defined by the appended claims.

The invention claimed is:

1. An optical waveguide fiber, comprising:
   a core region having a refractive index and an inner and an outer radius;
   an inner clad layer surrounding and in contact with the core region, the inner clad layer having a refractive index, and an outer radius; and
   an outer clad layer surrounding and in contact with the inner clad layer, the outer clad layer having a refractive index;
   wherein, the refractive index and the radii of the core region, the inner clad layer and the outer clad layer are chosen from the following ranges:
   the refractive index of the core region within the range of from about 1.332 to about 1.628;
   the refractive index of the inner clad layer within the range of from about 1.301 to about 1.591;
   the refractive index of the outer clad layer within the range of from about 1.305 to about 1.595;
   the outer radius of the core region within the range of from about 1.71 μm to about 2.09 μm; and
   the outer radius of the inner clad layer within the range of from about 4.41 μm to about 5.39 μm.

2. The optical waveguide fiber of claim 1, wherein the refractive index of the core region is about 1.480.

3. The optical waveguide fiber of claim 2, wherein the refractive index of the inner cladding is about 1.446.

4. The optical waveguide fiber of claim 3, wherein the refractive index of the outer cladding is about 1.450.

5. The optical waveguide fiber of claim 1, wherein the outer radius of the core region is about 1.9 μm.

6. The optical waveguide fiber of claim 5, wherein the outer radius of the inner cladding is about 4.9 μm.

7. The optical waveguide fiber amplifier of claim 6, wherein the outer cladding has an outer radius of about 125 μm or greater.

8. The optical waveguide fiber of claim 1, wherein the fiber has a zero dispersion wavelength of within the range of about 1.344 μm to about 1.642 μm.

9. The optical waveguide fiber of claim 8, wherein the zero dispersion wavelength is about 1.493 μm.

10. The optical waveguide fiber of claim 1, wherein the fiber has a mode field diameter of within the range of about 3.96 μm to about 4.84 μm.

11. The optical waveguide fiber of claim 10, wherein the mode field diameter is about 4.4 μm.

12. The optical waveguide fiber of claim 1, wherein the relative indices and radii of the core region, inner clad layer and outer clad layer define a step index profile.

13. An optical communications system, comprising:
    an optical signal transmitter for transmitting an optical signal;
    an optical signal receiver for receiving the optical signal; and
    the optical waveguide fiber of claim 1 for guiding the optical signal from the transmitter to the receiver.

14. An optical waveguide fiber, comprising:
    a core region having a refractive index, and an outer radius;
    an inner clad layer surrounding and in contact with the core region, the inner clad layer having a refractive index, and an outer radius;
    an outer clad layer surrounding and in contact with the inner clad layer, the outer clad layer having a refractive index; and
    wherein, the refractive index and the radii of the core region, the inner clad layer and the outer clad layer are chosen from the following ranges:
        the refractive index of the core region within the range of from about 1.338 to about 1.636;
        the refractive index of the inner clad layer within the range of from about 1.307 to about 1.597;
        the refractive index of the outer clad layer within the range of from about 1.311 to about 1.603;
        the outer radius of the core region within the range of from about 2.61 μm to about 3.19 μm; and
        the outer radius of the inner clad layer within the range of from about 5.31 μm to about 6.49 μm.

15. The optical waveguide fiber of claim 14, wherein the refractive index of the core region is about 1.487.

16. The optical waveguide fiber of claim 15, wherein the refractive index of the inner clad layer is about 1.452.

17. The optical waveguide fiber of claim 16, wherein the refractive index of the outer clad layer is about 1.457.

18. The optical waveguide fiber of claim 14, wherein the outer radius of the core region is about 2.9 μm.

19. The optical waveguide fiber of claim 18, wherein the outer radius of the inner clad layer is about 5.9 μm.

20. The optical waveguide fiber of claim 19, wherein the outer clad layer has an outer radius of about 125 μm or greater.

21. The optical waveguide fiber of claim 14, wherein the fiber has a zero dispersion wavelength of within the range of about 1.344 μm to about 1.642 μm.

22. The optical waveguide fiber of claim 21, wherein the zero dispersion wavelength is about 1.493 μm.

23. The optical waveguide fiber of claim 14, wherein the fiber has a mode field diameter of within the range of about 3.78 μm to about 4.62 μm.

24. The optical waveguide fiber of claim 23, wherein the mode field diameter is about 4.2 μm.

25. The optical waveguide fiber of claim 14, wherein the relative indices and radii of the core region, inner clad layer and outer clad layer define a graded index profile.

26. An optical communication system, comprising:
    an optical signal transmitter for transmitting an optical signal;
    an optical signal receiver for receiving the optical signals; and
    the optical waveguide fiber of claim 14 for guiding the optical signal from the transmitter to the receiver.

27. A method for constructing an optical waveguide fiber amplifier, comprising:
    forming a core region having an index of refraction within the range of from about 1.332 to about 1.628, and an outer radius within the range of from about 1.71 μm to about 2.09 μm;
    forming an inner clad layer about the core region, the inner clad layer having a index of refraction within the range of from about 1.301 to about 1.591, and an outer radius of about 4.41 μm to about 5.39 μm; and
    forming an outer clad layer about the inner clad layer, the outer clad layer having an index of refraction within the range of from about 1.305 to about 1.595.

28. The method according to claim 27, wherein the core region forming step includes providing the core region with a refractive index of about 1.48.

29. The method according to claim 28, wherein the inner clad layer forming step includes providing the inner clad layer with a refractive index of about 1.446.

30. The method according to claim 29, wherein the outer clad layer forming step includes providing the outer clad layer with a refractive index of about 1.450.

31. The method according to claim 27, wherein the core region forming step includes providing the core region with an outer diameter of about 1.9 μm.

32. The method according to claim 31, wherein the inner cladding forming step includes providing the inner cladding with an outer diameter of about 4.9 μm.

33. The method according to claim 32, wherein the outer cladding forming step includes providing the outer cladding with an outer radius of about 125 μm or greater.

34. The method according to claim 27, wherein the steps of forming the core region, the inner clad layer and the outer clad layer include providing the optical waveguide fiber with a zero dispersion wavelength of within the range of about 1.344 μm to about 1.642 μm.

35. The method according to claim 28, wherein the steps of forming the core region, the inner clad layer and the outer clad layer include providing the optical waveguide fiber with a zero-dispersion wavelength of about 1.493 μm.

36. The method according to claim 27, wherein the steps of forming the core region, the inner clad layer and the outer clad layer include providing the optical waveguide fiber with a mode field diameter of within the range of about 3.96 μm to about 4.84 μm.

37. The method according to claim 27, wherein the steps of forming a core region, forming an inner clad layer and an outer clad layer including providing the optical waveguide fiber with a step index profile.

38. A method for constructing an optical waveguide fiber, comprising:
    forming a core region having an index of refraction within the range of from about 1.338 to about 1.636, and an outer radius within the range of from about 2.61 μm to about 3.19 μm;
    forming an inner clad layer about the core region, the inner clad layer having an index with the range of from about 1.307 to about 1.597, and an outer radius of about 5.31 μm to about 6.49 μm; and
    forming an outer clad layer about the inner clad layer, the outer clad layer having a relative index within the range of from about 1.311 to about 1.603.

39. The method according to claim 38, wherein the core region forming step includes providing the core region with a refractive index of about 1.487.

40. The method according to claim 39, wherein the inner clad layer forming step includes providing the inner clad layer with a refractive index of about 1.452.

41. The method according to claim 40, wherein the outer clad layer forming step includes providing the outer clad layer with a refractive index of about 1.457.

42. The method according to claim 38, wherein the core region forming step includes providing the core region with an outer diameter of about 2.9 μm.

43. The method according to claim 42, wherein the inner cladding forming step includes providing the inner cladding with an outer diameter of about 5.9 μm.

44. The method according to claim 43, wherein the outer cladding forming step includes providing the outer cladding with an outer radius of about 125 μm or greater.

45. The method according to claim 38, wherein the steps of forming the core region, the inner clad layer and the outer clad layer include providing the optical waveguide fiber with a zero dispersion wavelength of within the range of from about 1.344 μm to about 1.642 μm.

46. The method according to claim 45, wherein the steps of forming the core region, the inner clad layer and the outer clad layer include providing the optical waveguide fiber with a zero-dispersion wavelength of about 1.493 μm.

47. The method according to claim 38, wherein the steps of forming the core region, the inner clad layer and the outer clad layer include providing the optical waveguide fiber amplifier with a mode field diameter of within the range of about 3.78 μm to about 4.62 μm.

48. The method according to claim 38, wherein the steps of forming a core region, forming an inner clad layer and forming an outer clad layer includes providing the optical waveguide fiber with a graded index profile.

* * * * *